United States Patent
Jeong et al.

(10) Patent No.: US 9,912,597 B2
(45) Date of Patent: Mar. 6, 2018

(54) METHOD AND APPARATUS FOR CONTROLLING TRAFFIC OF RADIO ACCESS NETWORK IN A WIRELESS COMMUNICATION SYSTEM

(71) Applicant: Samsung Electronics Co., Ltd., Suwon-si, Gyeonggi-do (KR)

(72) Inventors: Sang-Soo Jeong, Suwon-si (KR); Song-Yean Cho, Seoul (KR); Han-Na Lim, Seoul (KR); Beom-Sik Bae, Suwon-si (KR); Young-Kyo Baek, Seoul (KR); Sung-Hwan Won, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 13/791,495

(22) Filed: Mar. 8, 2013

(65) Prior Publication Data

US 2014/0254356 A1 Sep. 11, 2014
US 2017/0346743 A9 Nov. 30, 2017

Related U.S. Application Data

(60) Provisional application No. 61/608,580, filed on Mar. 8, 2012.

(30) Foreign Application Priority Data

Mar. 29, 2012 (KR) ........................ 10-2012-0032140

(51) Int. Cl.
 *H04L 12/813* (2013.01)

(52) U.S. Cl.
 CPC ................................... *H04L 47/20* (2013.01)

(58) Field of Classification Search
 CPC ..... H04J 3/1629; H04J 3/247; H04L 61/6004; H04L 47/20; H04W 28/10
 See application file for complete search history.

(56) References Cited

U.S. PATENT DOCUMENTS 8,208,896 B2 * 6/2012 Li et al. ........................ 455/406
8,339,947 B2 * 12/2012 Lee et al. ...................... 370/230
8,339,964 B2 * 12/2012 Fodor et al. .................. 370/237
(Continued)

FOREIGN PATENT DOCUMENTS

EP 2037697 A1 3/2009
EP 2385721 A1 11/2011
(Continued)

OTHER PUBLICATIONS

International Search Report dated Jun. 18, 2013 in connection with international Application No. PCT/KR2013/001912; 5 pages.
(Continued)

*Primary Examiner* — Tejis Daya

(57) ABSTRACT

Provided is a method for controlling traffic of a Radio Access Network (RAN) in a wireless communication system. The method includes acquiring at least one of subscription class information of a User Equipment (UE) user and type information of an application or content; determining whether a congestion situation has occurred in the RAN; and controlling traffic for the UE based on the acquired information, if the congestion situation has occurred in the RAN.

14 Claims, 11 Drawing Sheets

(56) References Cited

U.S. PATENT DOCUMENTS

| | | | |
|---|---|---|---|
| 8,488,527 B2 * | 7/2013 | Koskinen | 370/328 |
| 8,566,455 B1 * | 10/2013 | Zhao et al. | 709/227 |
| 8,675,663 B2 * | 3/2014 | Siddam et al. | 370/395.21 |
| 8,798,005 B1 * | 8/2014 | Vargantwar et al. | 370/332 |
| 8,912,361 B2 | 12/2014 | Schaub et al. | |
| 9,042,221 B2 | 5/2015 | Kim et al. | |
| 2005/0282571 A1 | 12/2005 | Oprescu-Surcobe et al. | |
| 2006/0159016 A1 * | 7/2006 | Sagfors et al. | 370/230 |
| 2008/0186862 A1 * | 8/2008 | Corbett | H04W 72/0486 370/237 |
| 2010/0080153 A1 * | 4/2010 | Kahn | H04W 72/1247 370/310 |
| 2010/0105390 A1 * | 4/2010 | Ishii | 455/436 |
| 2011/0235569 A1 | 9/2011 | Huang et al. | |
| 2012/0039175 A1 * | 2/2012 | Sridhar | H04L 47/125 370/236 |
| 2012/0039176 A1 | 2/2012 | Eshan et al. | |
| 2012/0051216 A1 * | 3/2012 | Zhang | H04L 47/12 370/230 |
| 2012/0140632 A1 | 6/2012 | Ncrp et al. | |
| 2012/0232293 A1 | 9/2012 | Schaub et al. | |
| 2012/0257499 A1 * | 10/2012 | Chatterjee et al. | 370/232 |
| 2013/0042011 A1 * | 2/2013 | Sugizaki et al. | 709/227 |
| 2013/0051228 A1 | 2/2013 | Kim et al. | |
| 2013/0194937 A1 * | 8/2013 | Sridhar et al. | 370/252 |
| 2014/0003233 A1 * | 1/2014 | Rune | H04L 47/125 370/230 |
| 2014/0177535 A1 * | 6/2014 | Tjandra | H04W 72/10 370/329 |
| 2015/0009826 A1 * | 1/2015 | Ma | H04W 28/0268 370/235 |

FOREIGN PATENT DOCUMENTS

| | | |
|---|---|---|
| KR | 20120011012 A | 2/2012 |
| KR | 20120019504 A | 3/2012 |
| WO | WO 2011/006889 A1 | 1/2011 |
| WO | WO 2011/057292 A1 | 5/2011 |
| WO | WO 2013133676 A1 | 9/2013 |

OTHER PUBLICATIONS

Extended European Search Report dated Nov. 6, 2015 in connection with European Application No. 13757733.4; 10 pages.

* cited by examiner

METHOD AND APPARATUS FOR CONTROLLING TRAFFIC OF RADIO ACCESS NETWORK IN A WIRELESS COMMUNICATION SYSTEM

PRIORITY

This patent application claims priorities under 35 U.S.C. § 119(e) to U.S. Provisional Patent Application No. 61/608,580, filed on Mar. 8, 2012 in the United States Patent and Trademark Office, and Korean Patent Application No. 10-2012-0032140, filed on Mar. 29, 2012 in the Korean Industrial Property Office, the contents of which are incorporated herein by reference.

BACKGROUND OF THE INVENTION

Field of the Invention

The present invention relates generally to a wireless communication system, and more particularly, to a method and apparatus for controlling traffic of a Radio Access Network (RAN) in a wireless communication system.

Description of the Related Art

Wireless communication systems have been developed to provide voice services while ensuring the user's activity. The wireless communication systems have gradually extended their coverage not only to the voice services but also to data services, and now they have been developed to be able to provide high-speed data services. However, in the case of the currently available wireless communication systems, the lack of resources may occur and users require higher-speed services than ever, so more improved wireless communication systems are required.

To meet these requirements, 3$^{rd}$ Generation Partnership Project (3GPP) is proceeding with standardization of the Long Term Evolution (LTE) communication system as one of the next-generation wireless communication systems under development. The LTE communication system is a high-speed packet-based communication system having a transfer rate of a maximum of about 100 Mbps.

There is a need for measures to control traffic depending on the characteristics of the UE or the service/application when congestion situations occur in the UP, in the wireless communication system.

SUMMARY OF THE INVENTION

Problems to be Solved by the Invention

An aspect of the present invention provides a method and apparatus for controlling traffic of a RAN in a wireless communication system.

Another aspect of the present invention provides a method and apparatus for controlling traffic depending on subscription information of a UE, characteristics of a service/application, and the amount of traffic being transmitted and received, when congestion occurs in a UP where data of the UE is transmitted and received, in a wireless communication system.

Means for Solving Problems

In accordance with one aspect of the present invention, there is provided a method for controlling traffic of a Radio Access Network (RAN) in a wireless communication system. The method includes acquiring at least one of subscription class information of a User Equipment (UE) user and type information of an application or content; determining whether a congestion situation has occurred in the RAN; and controlling traffic for the UE based on the acquired information, if the congestion situation has occurred in the RAN.

In accordance with another aspect of the present invention, there is provided a method for controlling traffic of a Radio Access Network (RAN) in a wireless communication system. The method includes determining whether a congestion situation has occurred in the RAN; if the congestion situation has occurred in the RAN, determining whether an amount of traffic transmitted and received for a User Equipment (UE) has reached an amount of traffic, which is determined depending on subscription information of a UE user; and controlling traffic for the UE based on the determination results.

In accordance with further another aspect of the present invention, there is provided a method for controlling traffic of a Radio Access Network (RAN) in a wireless communication system. The method includes determining whether a congestion situation has occurred in the RAN; sending a message indicating the occurrence of the congestion situation, if the congestion situation has occurred in the RAN; receiving bearer Quality of Service (QoS) information which is updated depending on the congestion situation; and controlling traffic for a User Equipment (UE) based on the bearer QoS information.

In accordance with yet another aspect of the present invention, there is provided an apparatus for controlling traffic of a Radio Access Network (RAN) in a wireless communication system. The apparatus includes a transceiver for acquiring at least one of subscription class information of a User Equipment (UE) user and type information of an application or content; and a controller for determining whether a congestion situation has occurred in the RAN, and controlling traffic for the UE based on the acquired information, if the congestion situation has occurred in the RAN.

In accordance with still another aspect of the present invention, there is provided an apparatus for controlling traffic of a Radio Access Network (RAN) in a wireless communication system. The apparatus includes a controller for determining whether a congestion situation has occurred in the RAN, determining, if the congestion situation has occurred in the RAN, whether an amount of traffic transmitted and received for a User Equipment (UE) has reached an amount of traffic, which is determined depending on subscription information of a UE user, and controlling traffic for the UE based on the determination results.

In accordance with still another aspect of the present invention, there is provided an apparatus for controlling traffic of a Radio Access Network (RAN) in a wireless communication system. The apparatus includes a transceiver for sending, if a congestion situation has occurred in the RAN, a message indicating the occurrence of the congestion situation, and receiving bearer Quality of Service (QoS) information which is updated depending on the congestion situation; and a controller for determining whether the congestion situation has occurred in the RAN, and controlling traffic for a User Equipment (UE) based on the received bearer QoS information, if the congestion situation has occurred in the RAN.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Although embodiments of the present invention will be described in detail with reference to the basic LTE communication system, it will be apparent to those of ordinary skill in the art that the embodiments of the present invention may be applied to any other communication/computer systems having the similar technical backgrounds and system types, without departing from the scope of the invention.

The present invention provides a method and apparatus for controlling traffic in a wireless communication system. The present invention provides the following four embodiments. A first embodiment of the present invention is an embodiment for controlling traffic depending on the subscription information of a UE. A second embodiment of the present invention is an embodiment for controlling traffic depending on the characteristics of a service/application. A third embodiment of the present invention is an embodiment for controlling traffic depending on the amount (for example, the traffic volume) of traffic being transmitted and received. A fourth embodiment of the present invention is an embodiment for controlling traffic based on the bearer QoS.

A method and apparatus for controlling traffic of a RAN in a wireless communication system according to embodiments of the present invention will be described in detail below with reference to the accompanying drawings.

Figure 1:
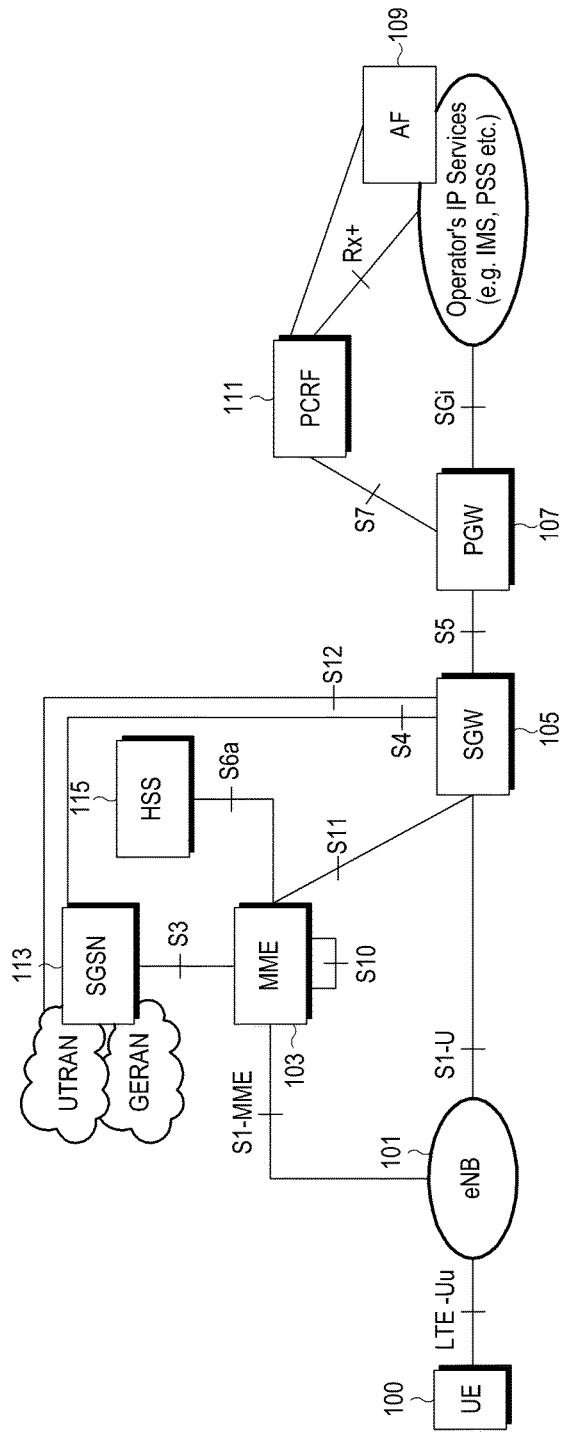
FIG. 1 illustrates a structure of a general LTE communication system.

FIG. 1 illustrates a structure of a general LTE communication system.

Referring to FIG. 1, a network of the LTE communication system includes an evolved Node B (eNB) 101, a Mobility Management Entity (MME) 103, and a Serving Gateway (SGW) 105.

A User Equipment (UE) 100 may access the external network via the eNB 101, the SOW 105, and a Packet Data Network (PDN) Gateway (PGW) 107.

An Application Function (AF) 109 is a device for exchanging application-related information with the user at an application level. A Policy and Charging Rule Function (PCRF) 111 is a device for controlling the policy related to Quality of Service (QoS) of the user who has subscribed to the UE 100, and a Policy and Charging Control (PCC) rule corresponding to the policy is delivered to the PGW 107 and applied thereto.

The eNB 101 corresponds to the legacy Node B in the Universal Mobile Telecommunications System (UMTS). The eNB 101 is connected to the UE 100 by a wireless channel, and plays a more complex role than the legacy Node B.

In the LTE communication system, traffic for all UEs, including real-time services such as Voice over Internet Protocol (VoIP), are served over shared channels. Therefore, in the LTE communication system, a device for performing scheduling by collecting context information of the UEs is required, and the eNB 101 serves as the scheduling device.

The SGW 105, a device for providing data bearers, generates or removes data bearers under control of the MME 103. The MME 103 is a device that is responsible for a variety of control functions, and one MME 103 may be connected to a plurality of eNBs. A Serving General Packet Radio Service (GPRS) Support Node (SGSN) 113 controls packet information, and a Home Subscriber Server (HSS) 115 authenticates the UE 100, and manages the QoS profile that is to be used by the UE 100.

Generally, a User Plane (UP) represents the paths which connects the UE 100 to the eNB 101, the eNB 101 to the SGW 105, and the SGW 105 to the PGW 107, and in which user data is transmitted and received. Among these paths, the path between the UE 100 and the eNB 101 uses wireless channels whose resources are severely limited. The UE 100 and the eNB 101 are included in a RAN.

In the LTE communication system, QoS may be applied in units of bearers. One bearer is used to transmit IP flows having the same QoS requirement. In the bearer may be designated QoS-related parameters, which include Quality Control Information (QCI) and Allocation and Retention Priority (ARP).

The RAN needs to transmit and receive data to/from the UE 100 within the limited frequency. Congestion situations may occur in the RAN, if there is an increase in the number of UEs within the cell observed or managed by the eNB 101, or if there is an increase in traffic transmitted/received by the UE 100. Conventionally, if the congestion situations occur, the eNB 101 determines the allocation order of resources using QoS parameters assigned to bearers. However, since there are various types of users, the eNB 101 needs to handle the congestion situations depending on the subscription information (for example, information about premium users and regular users who are distinguished depending on their use plan or subscription plan) for the user of the UE 100. In addition, one service or application may include a variety of media or IP flows having different QoS requirements. For example, if one web page includes a variety of media (for example, texts, photos, videos, music and the like), each of the media have different QoS requirements in the existing system. If integrated traffic control is not possible for congestion situations of the media, one medium may be transmitted in advance and the transmission of another medium may be delayed (for example, videos may be transmitted first as they correspond to a bearer having the high-priority QCI, and texts may not be transmitted as they correspond to a bearer having the low-priority QCI), causing degradation of the Quality of Experience (QoE).

The first embodiment of the present invention provides a method for controlling traffic depending on the subscription information of a UE user in the congestion situations. Specifically, an eNB stores information (for example, parameters for QCI, Allocation and Retention. Priority (ARP) and Aggregated Maximum Bit Rate (AMBR)) related to the bearer used by a UE. The information related to the bearer used by the UE does not include the information indicating that a certain UE is higher than another UE in priority in the congestion situations. If the eNB may determine priority of each UE or determine whether a certain UE is a UE of a premium user, the eNB may first transmit traffic for a high-priority UE in the congestion situations.

Accordingly, in the first embodiment of the present invention, an eNB receives subscription information including a premium user flag indicating priority of each UE or indicating whether a certain UE is a UE of a premium user, from an HSS through an MME, and controls traffic depending on the received subscription information. This method will be described in detail with reference to FIG. 2.

Figure 2:
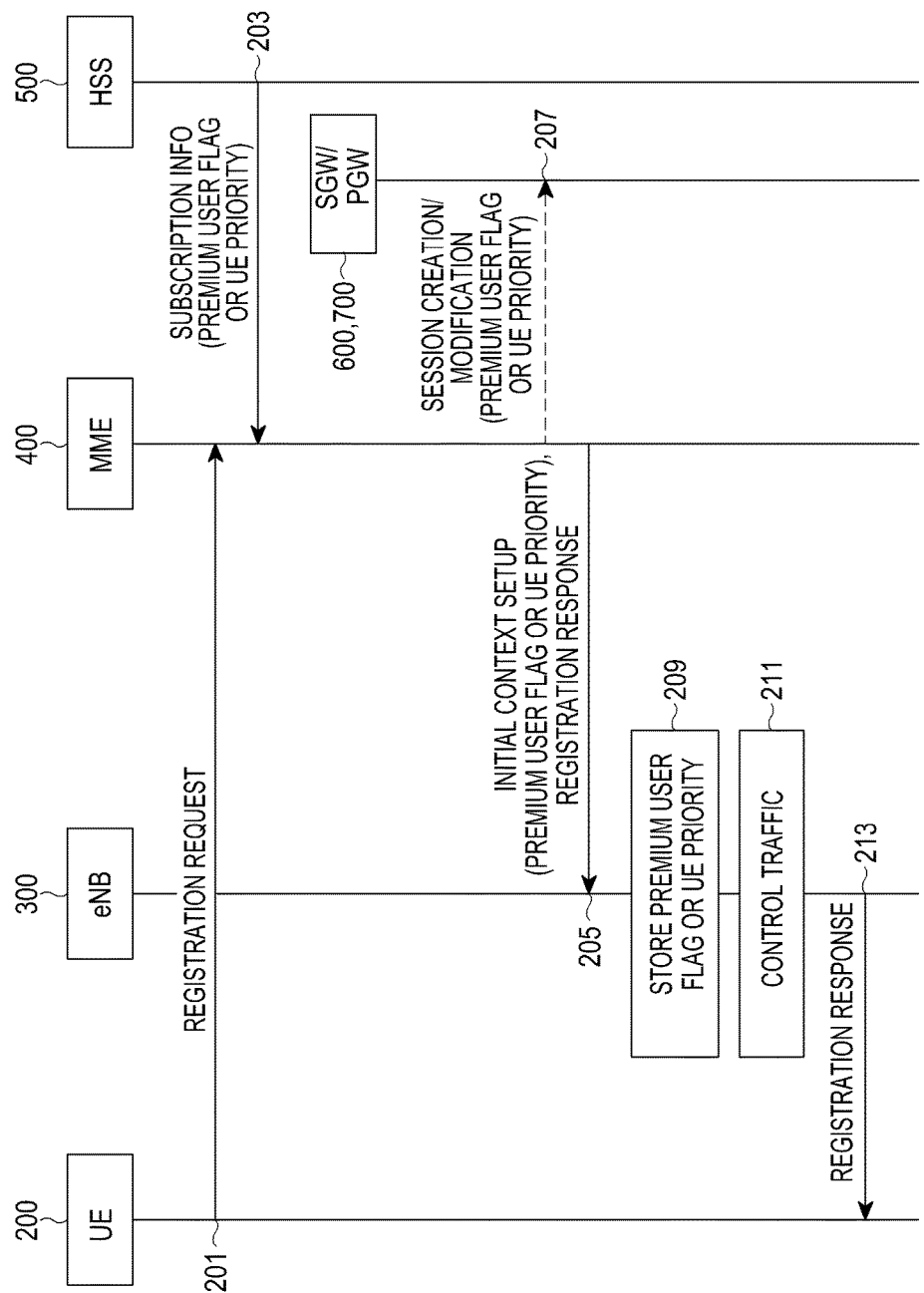
FIG. 2 is a signal flow diagram illustrating a process of controlling traffic based on subscription information of a UE in a wireless communication system according to a first embodiment of the present invention.

FIG. 2 is a signal flow diagram illustrating a process of controlling traffic based on subscription information of a UE in a wireless communication system according to a first embodiment of the present invention.

Referring to FIG. 2, in step 201, a UE 200 sends a registration request message (for example, an attach request message, a Tracking Area Update (TAU) request message or the like) to an MME 400 via an eNB 300. In step 203, the MME 400 receives subscription information (for example, a user's subscription class, subscription data including UE priority or a premium user flag, or the like) from an HSS 500. The premium user flag may indicate whether a certain user is a user of the top class among the user subscription classes which are distinguished depending on subscription data (service subscription plan) of each user. In other words, the premium user flag is used to determine the user, to which a service needs to be delivered more smoothly, among a plurality of users. The user's subscription class is a value based on which it is possible to determine relative priority for traffic transmission among subscribers.

In step 205, upon receiving the subscription data, the MME 400 sends an initial context setup message for setting up a context related to the UE 200 and a registration accept message, to the eNB 300. The initial context setup message includes a premium user frame or a UE priority included in the received subscription data.

In step 207, during session creation/modification, the MME 400 may send to an SGW 600 a session creation/modification request message including the premium user flag or UE priority included in the subscription data. In step 209, the eNB 300 stores the premium user flag or UE priority included in the initial context setup message received from the MME 400, and other QoS parameters. In step 211, the eNB 300 controls traffic depending on the premium user flag or UE priority (user subscription class) if congestion situations have occurred. In step 213, the eNB 300 sends a registration accept message to the UE 200. When controlling traffic, the eNB 300 may first consider a bearer of at least one UE having a premium user flag, or may store information about UEs based on UE priority (user subscription class) and then perform scheduling for a UE having the same priority, based on bearer QCI.

As such, the first embodiment of the present invention may improve the QoE in the congestion situations of the RAN, since it can control traffic depending on the subscription of the UE.

The second embodiment of the present invention provides a method for controlling traffic depending on the QoS information of each service (or content)/application. As described above, conventionally, in some cases, it is difficult to meet the QoE if one service or application is comprised of multiple media or IP flows, since the QoS is applied in units of bearers in the eNB or PGW/PCRF. To solve these and other problems, the second embodiment of the present invention proposes a service (content)/application descriptor. The service (content)/application descriptor may be used as a component of the PCC rule, or may be used in the form of separate control information. The service (content)/application descriptor may be used to acquire type information of a service (or content). The service (content)/application descriptor will be referred to herein as a service/application descriptor for short, and the meaning of the term 'service' as used herein may include the meaning of the term 'content'.

Now, reference will be made to FIG. 3, to describe the service/application descriptor.

Figure 3:
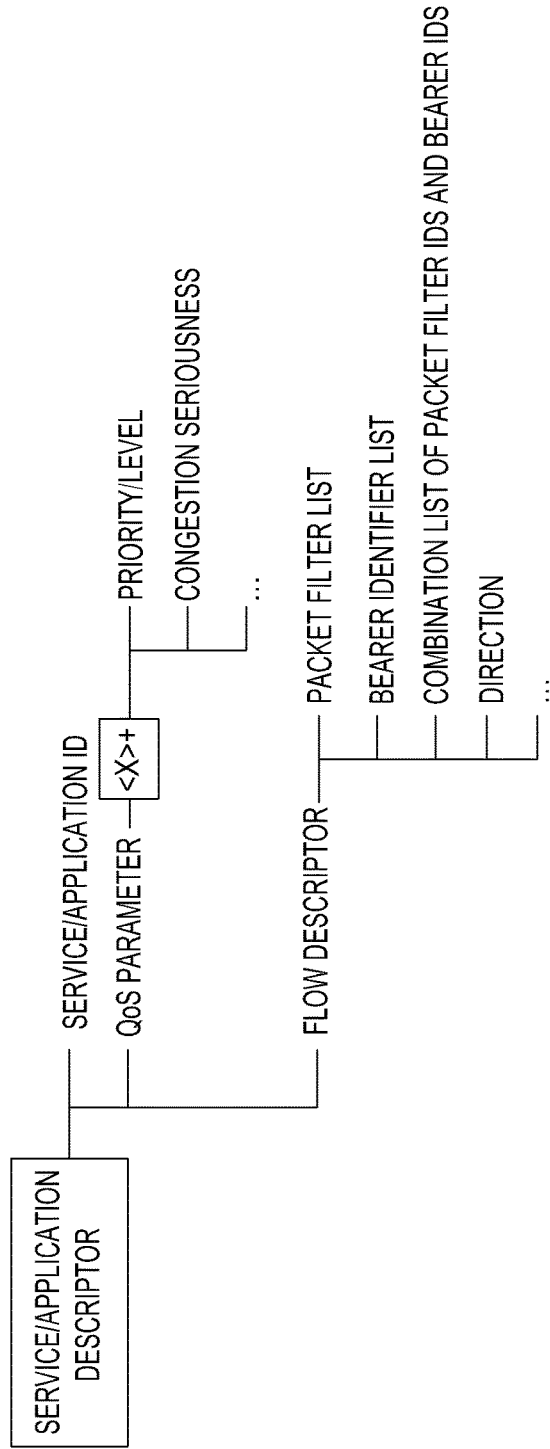
FIG. 3 illustrates a service/application descriptor used in a second embodiment of the present invention.

FIG. 3 illustrates a service/application descriptor used in a second embodiment of the present invention.

Referring to FIG. 3, the service/application descriptor includes a service application Identifier (ID), a QoS parameter, and a flow descriptor indicating IP flows that belong to a specific service or application.

The QoS parameter may include a priority/level parameter indicating the QoS characteristics, and a congestion seriousness parameter indicating that the descriptor is valid in a specific congestion situation. The QoS parameter may include a combination of multiple priority/level parameters and congestion seriousness parameters. <X>+ in FIG. 3 represents that there are multiple combinations of sub leaves.

The flow descriptor may include a packet filter list (for example, a transmit/receive IP address range, a transmit/receive port range, a protocol type, TCO and the like) indicating a service flow, a predefined bearer identifier list, a list of combinations of particular bearer identifiers and packet filter identifiers indicating IP flows belonging to a bearer, and a direction parameter indicating a transmission direction such as uplink, downlink and hi-direction.

When the PCRF delivers the PCC rule to the PGW (PCEF), the service/application descriptor configured as described above may be transmitted as an additional component of the PCC rule, or may be transmitted together with the existing PCC rule. For convenience of description, it will be assumed herein that the service/application descriptor is transmitted in the PCC rule. However, it will be apparent to those of ordinary skill in the art that the service/application descriptor may be transmitted together with the existing PCC rule according to an embodiment of the present invention. In addition, this information may be delivered from a separate network entity (for example, a load manager), or may be directly set in the eNB.

The PGW or eNB may control traffic by performing QoS control exceeding the limits of the bearer for each service or application, depending on the information about the service/application descriptor. The PGW or eNB may also apply QoS appropriate for a specific congestion situation by comparing the congestion information measured by itself or received from other entities, with the congestion seriousness within the descriptor. For example, if the congestion degree determined by the eNB is 70%, a priority #1 may be applied to the service/application, and if the congestion degree is 80%, a priority #2 may be applied. If the congestion decree is 90%, a method such as requesting a new policy may be used.

Now, reference will be made to FIGS. 4 and 5, to describe a method for controlling traffic using the service/application descriptor.

Figure 4:
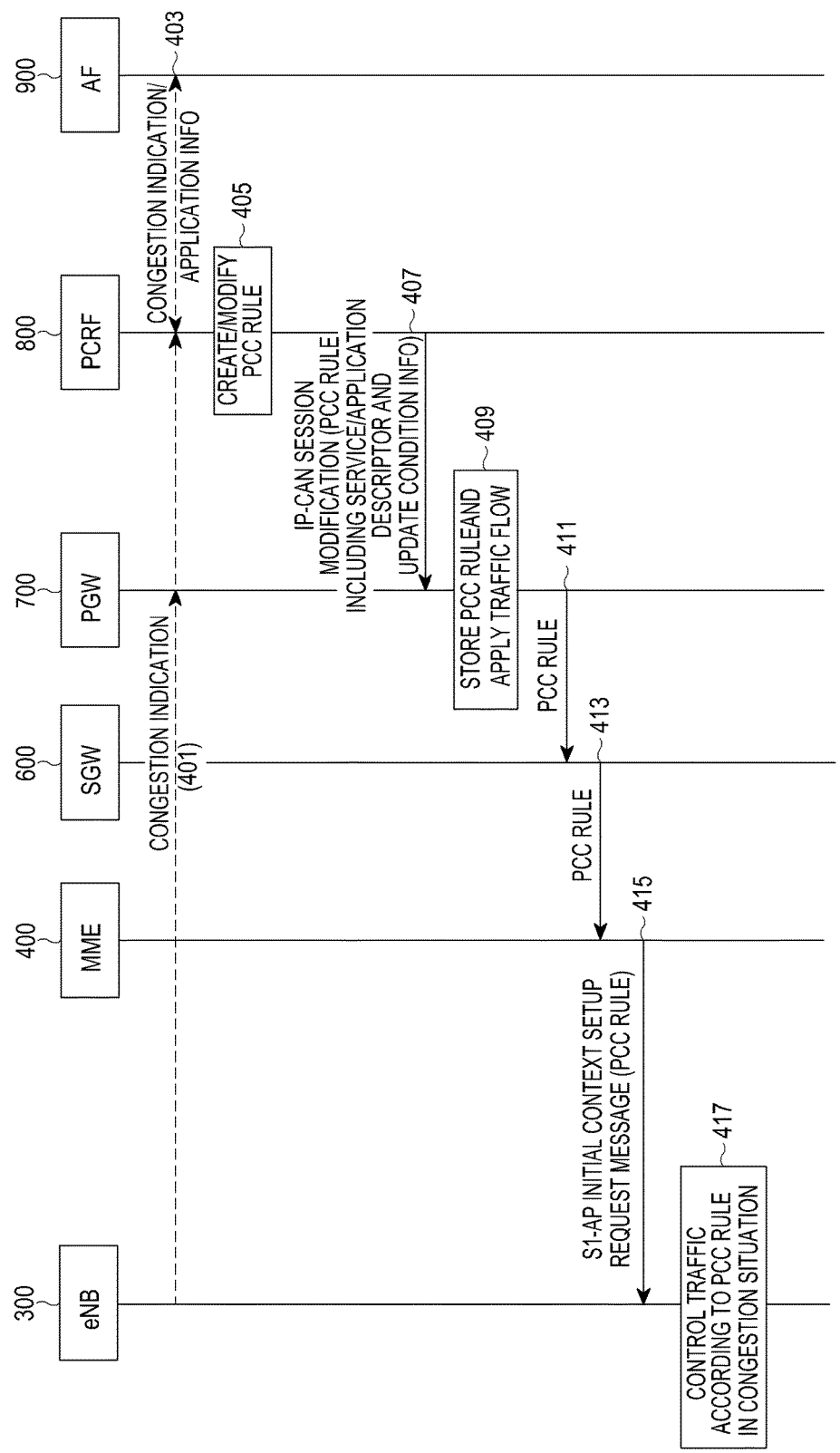
FIG. 4 is a signal flow diagram illustrating a process of controlling traffic based on a PCC rule including a service/application descriptor in a wireless communication system according to the second embodiment of the present invention.

FIG. 4 is a signal flow diagram illustrating a process of controlling traffic based on a PCC rule including a service/application descriptor in a wireless communication system according to the second embodiment of the present invention.

In the process illustrated in FIG. 4, a PCRF 800 delivers a PCC rule (including QoS information, a Service Data Flow (SDF) template, and a service/application descriptor) to an eNB 300 and a PGW 700.

First, the UE 200 and the network perform a PDN connection process depending on the circumstances. Specifically, in step 401, the eNB 300 sends a congestion indication to the PCRF 800 through an MME 400, an SGW 600 and a PGW 700. In step 403, the PCRF 800 exchanges the congestion indication and application information with an AF 900. If the AF 900 recognizes a change in QoS of the UE 200 or a need for new information by signaling of an application level between the UE 200 and the AF 900, the AF 900 may deliver to the PCRF 800 the information indicating the change in QoS or the need for new information.

In step 405, the PCRF 800 selectively creates a PCC rule including a service/application descriptor and update condition information for the PCC rule, or modifies the service/application descriptor and update condition information for the PCC rule, which are included in the existing PCC rule. In step 407, the PCRF 800 delivers the PCC rule including the service/application descriptor and update condition information for the PCC rule to the PGW 700 in an IP-CAN session modification or creation process.

In step 409, the PGW 700 stores the received PCC rule and applies the PCC rule to a traffic flow depending on the circumstances. In step 411, the PGW 700 sends the PCC rule to the SGW 600. In step 413, the SGW 600 transmits the PCC rule to the MME 400. In step 415, the MME 400 transmits the PCC rule to the eNB 300 using an S1-AP initial context setup request message.

In step 417, the eNB 300 stores the PCC rule included in the S1-AP initial context setup request message, and measures its own congestion level. If the measured congestion level is a congestion level corresponding to the congestion seriousness in the service/application descriptor included in the PCC rule, the eNB 300 controls traffic (or allocates resources) for data transmission taking into account the QoS parameter, for the flows corresponding to the service/application descriptor.

If the update conditions included in the PCC rule are satisfied, the eNB 300 may send a request for updating the PCC rule to the PCRF 800 through the MME 400, the SGW 600 and the PGW 700. The request may include information about the congestion level (or congestion seriousness) measured by the eNB 300.

Figure 5:
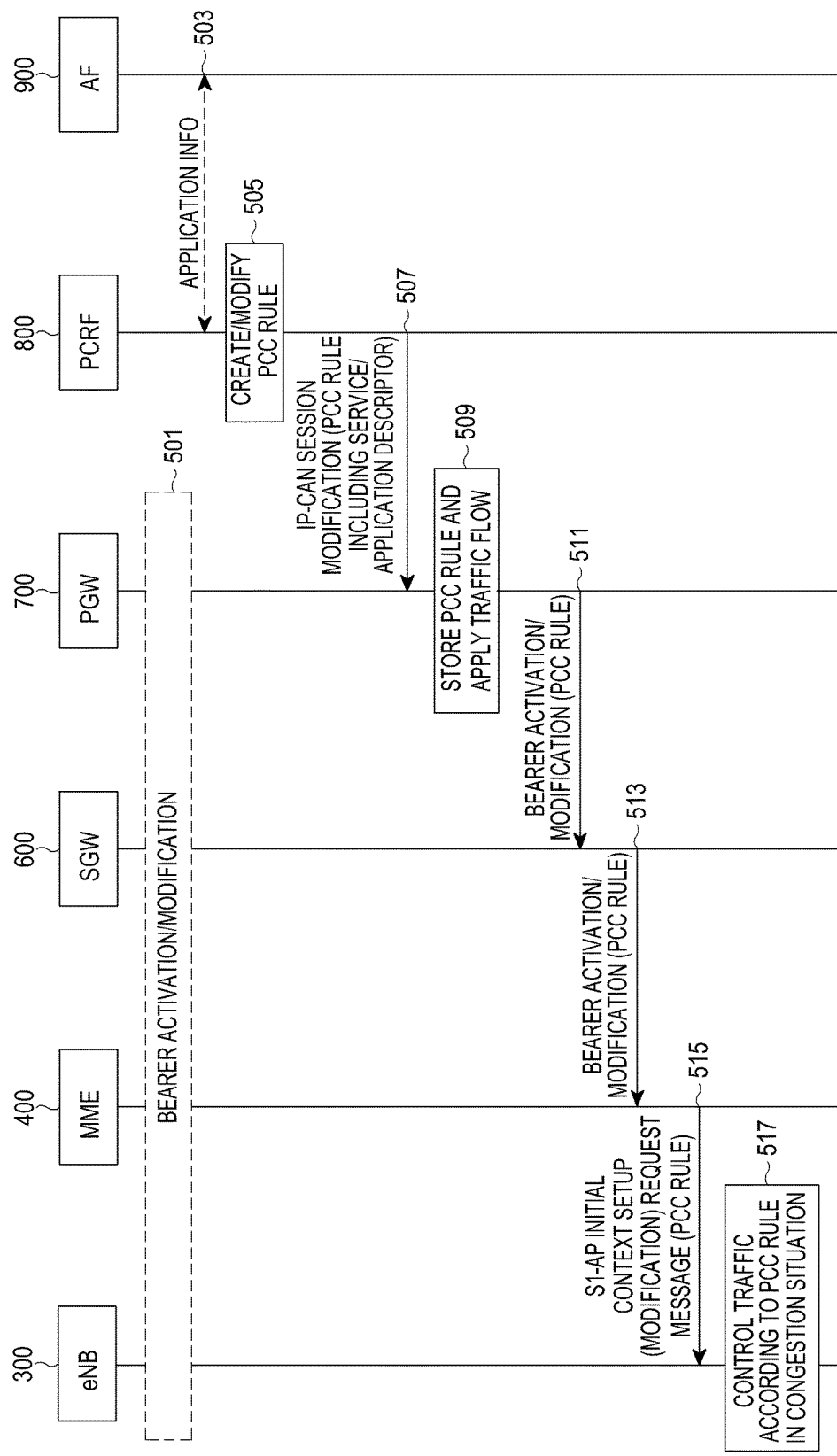
FIG. 5 is a signal flow diagram illustrating a process of controlling traffic based on a PCC rule including a service/application descriptor in a bearer setup process in a wireless communication system according to the second embodiment of the present invention.

FIG. 5 is a signal flow diagram illustrating a process of controlling traffic based on a PCC rule including a service/application descriptor in a bearer setup process in a wireless communication system according to the second embodiment of the present invention.

In the process illustrated in FIG. 5, the PCRF 800 delivers a PCC rule (including QoS information, an SDF template, and a service/application descriptor) to the eNB 300 and the PGW 700.

In step 501, the eNB 300, the MME 400, the SGW 600 and the PGW 700 perform a bearer activation/modification operation depending on the circumstances of the UE 200 and the network. In step 503, application information may be exchanged between the PCRF 800 and the AF 900.

In step 505, the PCRF 800 creates a PCC rule including a service/application descriptor, or modifies the existing PCC rule. Subsequently, in step 507, the PCRF 800 delivers the PCC rule including the service/application descriptor to the PGW 700 in an IP-CAN session modification or creation process.

In step 509, the PGW 700 stores the PCC rule including the service/application descriptor, and applies the PCC rule to a traffic flow depending on the circumstances. Unlike in the existing technology, since the PGW 700 needs to deliver the received PCC rule including the service/application descriptor up to the eNB 300, the PGW 700 sends the PCC rule including the service/application descriptor to the SGW 600 using a bearer activation/modification message in step 511. In step 513, the SGW 600 transmits the PCC rule including the service/application descriptor to the MME 400 using the same message as that of the PGW 700. In step 515, the MME 400 transmits the PCC rule including the service/application descriptor to the eNB 300 using an S1-AP initial context setup request message or a bearer context modification request message.

In step 517, the eNB 300 stores the PCC rule including the service/application descriptor, which is included in the S1-AP initial context setup request message or the bearer context modification request message, and the user/bearer context. The eNB 300 measures its own congestion level, and determines whether the measured congestion level is a congestion level corresponding to the congestion seriousness in the service/application descriptor. If the measured congestion level is a congestion level corresponding to the congestion seriousness, the eNB 300 controls traffic (or allocates resources) for data transmission taking into account the QoS parameter, for the flows corresponding to the service/application descriptor.

In the processes described in conjunction with FIGS. 4 and 5, if the service/application descriptor is not used, the PCRF 800 may additionally deliver only the condition information for the PCC rule when delivering the PCC rule to the eNB 300. The condition information for the PCC rule may be a reference value indicating the congestion seriousness measured by the eNB 300. In this case, the eNB 300 determines whether status information generated by measuring its own status is the status corresponding to the condition information for the PCC rule, and applies the PCC rule if the generated status information is the status corresponding to the condition information.

The policy that the PCRF 800 delivers to the eNB 300, may include update conditions for the PCC rule. If the situations of the eNB 300 satisfy the update conditions, the eNB 300 may send a request for updating the PCC rule to the PCRF 800 via the MME 400, the SGW 600 and the PGW 700, and the request may include the current status (or congestion seriousness) of the eNB 300.

In the second embodiment of the present invention, traffic may be controlled depending on the characteristics of the service/application by using the service/application descriptor, thus making it possible to improve the QoE in the congestion situations of the RAN.

The third embodiment of the present invention provides a method for controlling traffic depending on the traffic volume of the UE 200. Assuming that the UE 200 has priority only at a specific traffic volume depending on its user's subscription information, there is no need to give priority in the congestion situations if the traffic transmitted and received by the UE 200 has reached the traffic volume limit.

Figure 6:
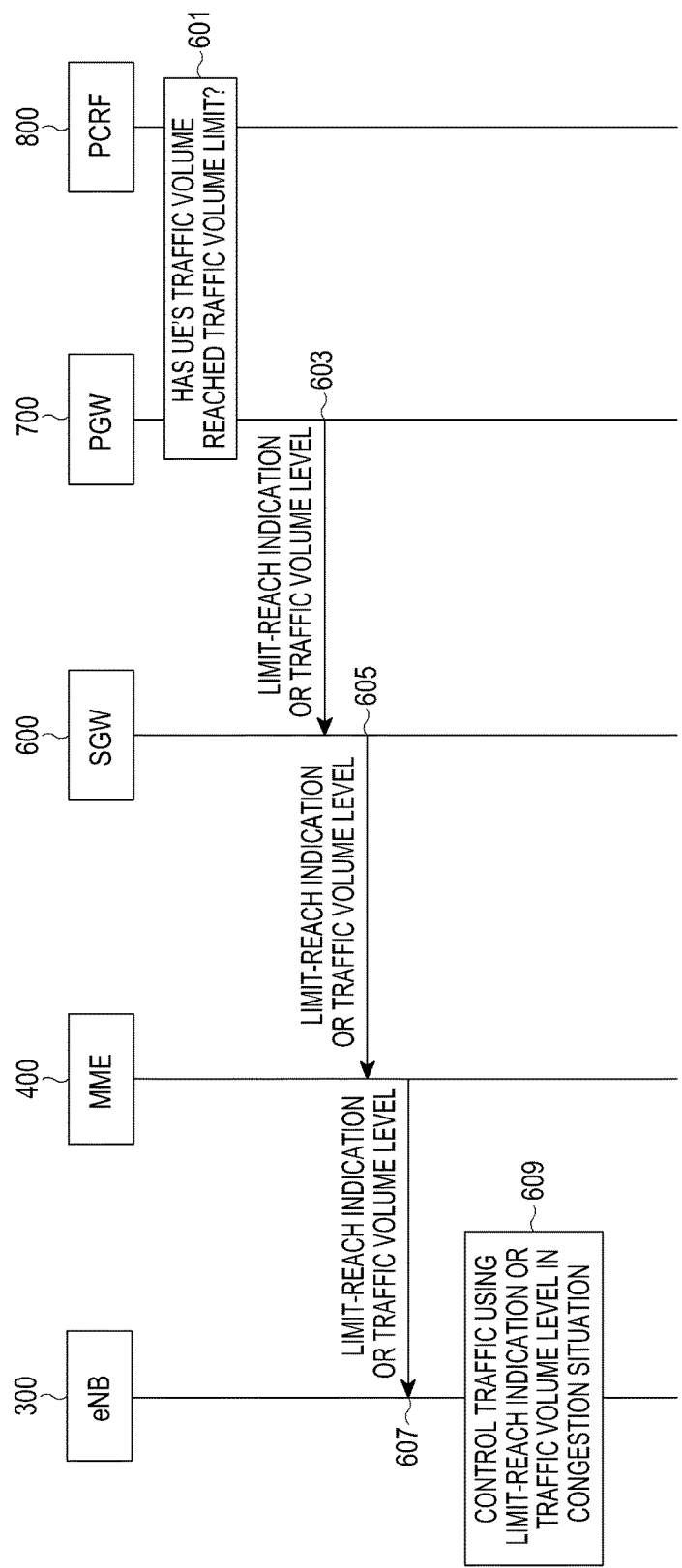
FIG. 6 is a signal flow diagram illustrating a process of controlling traffic depending on the traffic volume level in a wireless communication system according to a third embodiment of the present invention.

FIG. 6 is a signal flow diagram illustrating a process of controlling traffic depending on the traffic volume level in a wireless communication system according to a third embodiment of the present invention.

Referring to FIG. 6, the PGW 700, the PCRF 800 or a Traffic Detection Function (TDF, not shown) determines in step 601 whether the amount (for example, the traffic volume) of traffic transmitted and received by the UE 200 has reached the traffic volume limit, for which the UE 200 has subscribed. Information about the traffic volume limit may be included in subscription information of the UE 200.

If it is determined that the traffic volume of the UE 200 has reached the traffic volume limit, the PGW 700, the PCRF 800 or the TDF transmits an indication (or limit-reach indication) indicating the reach to the traffic volume limit or traffic volume level information corresponding to the amount of traffic used by the UE 200, to the SGW 600 in step 603. In step 605, the SGW 600 transmits the indication indicating the reach to the traffic volume limit, or the traffic volume level information to the MME 400. In step 607, the MME 400 transmits the indication indicating the reach to the traffic volume limit, or the traffic volume level information to the eNB 300.

In step 609, in the congestion situations, the eNB 300 determines whether the amount of traffic transmitted and received by the UE 200 has reached the traffic volume limit based on the indication indicating the reach to the traffic volume limit or the traffic volume level information, and controls traffic (for example, adjusts allocation priority of resources) for data transmission depending on the traffic volume level which has been used up to now by the UE 200.

Figure 7:
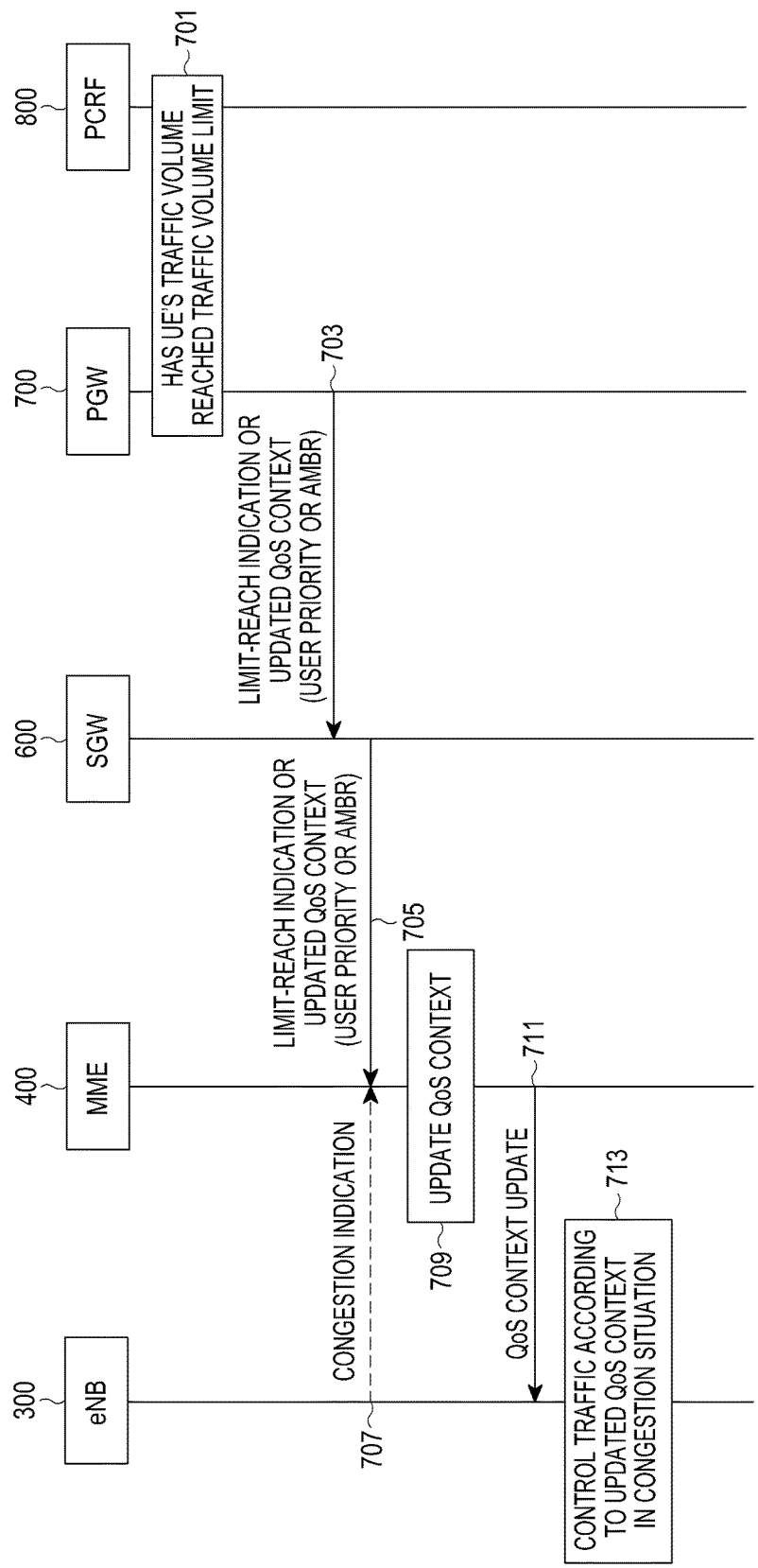
FIG. 7 is a signal flow diagram illustrating a process of controlling traffic based on the QoS context updated depending on the traffic volume in a wireless communication system according to the third embodiment of the present invention.

FIG. 7 is a signal flow diagram illustrating a process of controlling traffic based on the QoS context updated depending on the traffic volume in a wireless communication system according to the third embodiment of the present invention.

Referring to FIG. 7, the PGW 700, the PCRF 800 or the TDF determines in step 701 whether the traffic volume of the UE 200 has reached the traffic volume limit, for which the UE 200 has subscribed. If it is determined that the traffic volume of the UE 200 has reached the traffic volume limit, the PGW 700, the PCRF 800 or the TDF sends an indication indicating the reach to the traffic volume limit or an updated QoS context, to the SGW 600 in step 703. The updated QoS context may include a UE priority or an Access Point Name (APN)-Aggregated Maximum Bit Rate (AMBR), and the indication indicating the reach to the traffic volume limit or the updated QoS context may be transmitted to the SGW 600 using an update bearer request message.

In step 705, the SGW 600 transmits the indication indicating the reach to the traffic volume limit or the updated QoS context to the MME 400. In step 709, the MME 400 updates the QoS context (for example, user priority or APN-AMBR) based on the indication indicating the reach to the traffic volume limit or the updated QoS context. In step 711, the MME 400 transmits the updated QoS context to the eNB 300. In step 713, the eNB 300 controls traffic (for example, adjusts resource allocation) for data transmission depending on the QoS context received from the MME 400.

Steps 709 to 713 may be performed even if the eNB 300 has transmitted a congestion indication to the MME 400 in step 707.

Figure 8:
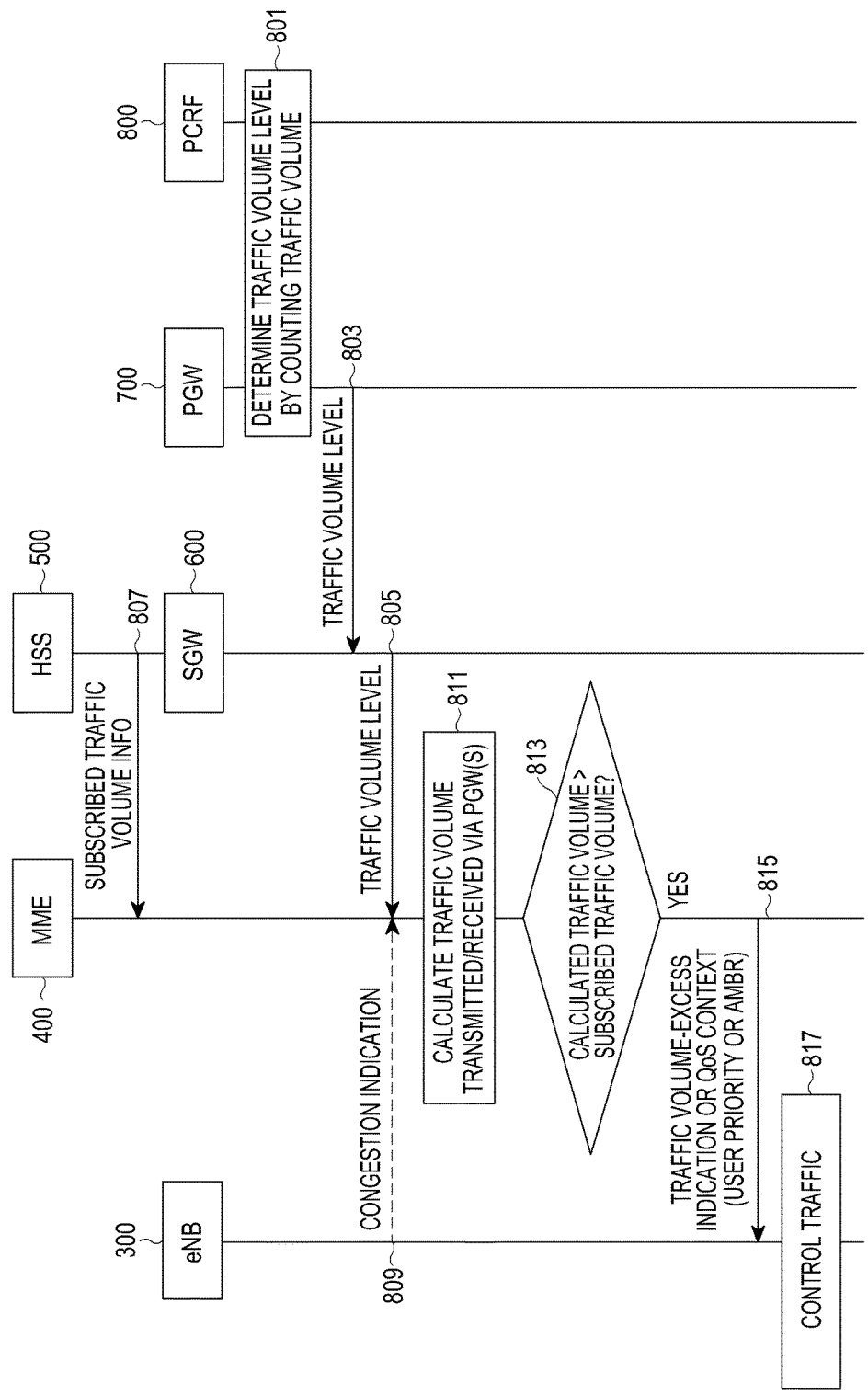
FIG. 8 is a signal flow diagram illustrating a process of controlling traffic based on the traffic volume level in a wireless communication system according to the third embodiment of the present invention.

FIG. 8 is a signal flow diagram illustrating a process of controlling traffic based on the traffic volume level in a wireless communication system according to the third embodiment of the present invention.

The example illustrated in FIG. 8 presents a method that can be used in the situations where one UE 200 has PDN connections through multiple different PGWs.

Referring to FIG. 8, in step 801, the PGW 700, the PCRF 800 or the TDF determines a traffic volume level by counting the traffic volume of the UE 200. In step 803, the PGW 700 transmits the traffic volume level to the SGW 600. In step 805, the SGW 600 transmits the traffic volume level to the MME 400. In step 807, the HSS 500 transmits information about the traffic volume, for which the UE 200 has subscribed (hereinafter referred to as a 'subscribed traffic volume' for short), to the MME 400.

In step 811, the MME 400 stores in advance the traffic volume levels, which have been transmitted from multiple PGWs, and calculates the total amount of traffic volume transmitted and received through the multiple PGWs. If it is determined in step 813 that the calculated total amount of traffic volume exceeds the amount of subscribed traffic volume, the MME 400 transmits an indication indicating the exceeding over the subscribed traffic volume, or the calculated total amount of traffic volume, to the eNB 300 in step 815. In step 817, the eNB 817 controls traffic (for example, adjusts resource allocation) for data transmission based on the indication indicating the exceeding over the subscribed traffic volume, or the calculated total amount of traffic volume.

Steps 811 to 817 may be performed even if the eNB 300 has transmitted a congestion indication to the MME 400 in step 809.

The limit of the traffic volume described in conjunction with FIGS. 6 to 8 may be agreed with (or contracted) by the user in units of a predetermined time. A predetermined amount of traffic may be first provided to the UE 200 in units of, for example, hours, days, weeks or months. If the contracted time is different, the traffic volume needs to be reset. The traffic volume needs to be reset, even if the user of the UE 200 changes his/her subscription information.

Figure 9:
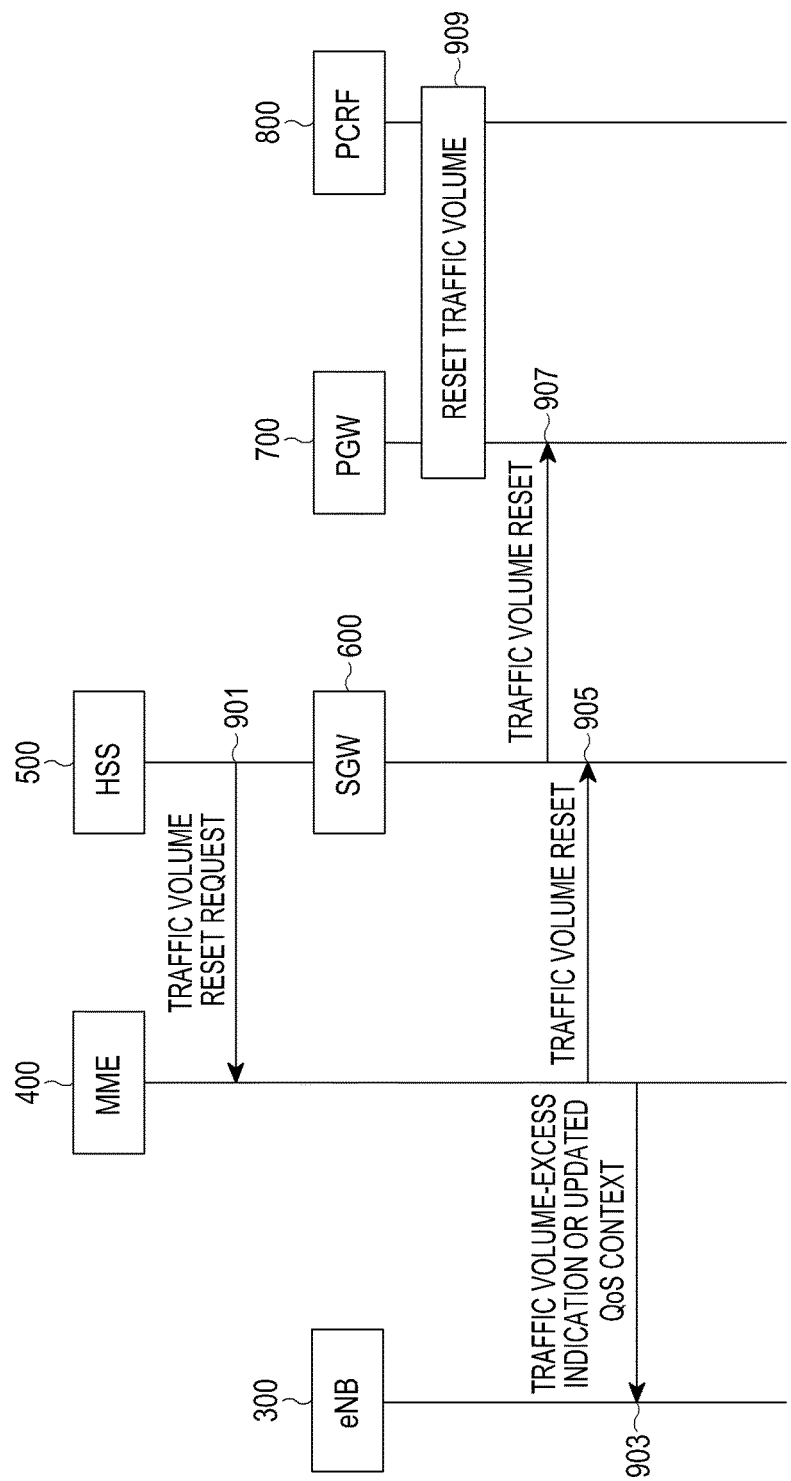
FIG. 9 is a signal flow diagram illustrating a process of resetting a traffic volume of a UE in a wireless communication system according to the third embodiment of the present invention.

FIG. 9 is a signal flow diagram illustrating a process of resetting a traffic volume of a UE in a wireless communication system according to the third embodiment of the present invention.

Referring to FIG. 9, in step 901, if the traffic volume of the UE 200 needs to be reset, the HSS 500 sends an insert subscription data message including information indicating the need to reset the traffic volume, to the MME 400. The insert subscription data message may include a traffic volume reset flag, or an initial value of the subscribed traffic volume (the initial value is '0' if counted in the form of increase, and in the opposite case, the initial value is a value of the subscribed traffic volume).

In step 903, the MME 400 transmits the indication indicating the non-reach to the limit of the traffic volume or the updated QoS context to the eNB 300 using an S1-AP UE context modification request message. At the same time, the MME 400 transmits information indicating the reset of the traffic volume to the SGW 600 in step 905. In step 907, the SGW 600 transmits information indicating the reset of the traffic volume to the PGW 700. In step 909, if necessary, the PGW 700 transmits information indicating the reset of the traffic volume to the PCRF 800 using an IP-CAN session modification message.

As such, the third embodiment of the present invention may control traffic depending on the traffic volume limit, for which the UE has subscribed, thereby making it possible to improve the QoE in the congestion situations of the RAN.

Next, reference will be made to FIG. 10, to describe the traffic control method according to the fourth embodiment of the present invention.

Figure 10:
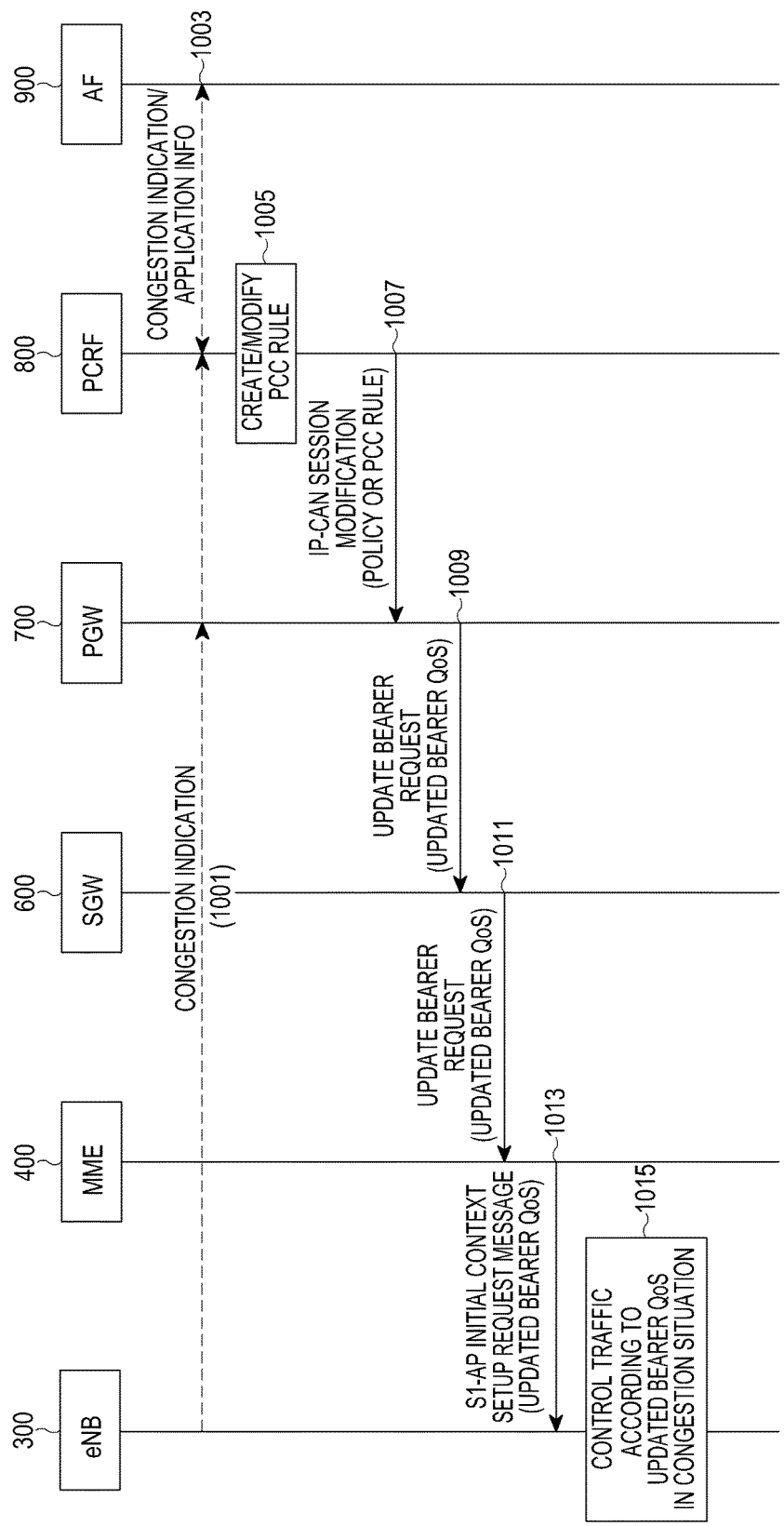
FIG. 10 is a signal flow diagram illustrating a process of controlling traffic based on the bearer QoS according to a fourth embodiment of the present invention.

FIG. 10 is a signal flow diagram illustrating a process of controlling traffic based on the bearer QoS according to a fourth embodiment of the present invention.

Referring to FIG. 10, in step 1001, upon detecting congestion situations, the eNB 300 sends a congestion indication to the PCRF 800 via the MME 400, the SGW 600 and the PGW 700 in order to notify the detection of the congestion situations. The PCRF 800 may receive the congestion indication, or may receive information indicating the need for modification of the policy (for example, PCC rule or another policy) from the AF 900 in a process of exchanging congestion indication and application information with the AF 900 in step 1003. In step 1005, the PCRF 800 modifies the PCC rule (or another policy; it will be assumed herein that only the PCC rule is modified).

In step 1007, the PCRF 800 delivers the modified PCC rule to the PGW 700 in an IP-CAN session modification process. Upon receiving the modified PCC rule, the PGW 700 sends an update bearer request message for requesting a change in the bearer QoS to the SGW 600 in step 1009. In step 1011, the SGW 600 forwards the update bearer request message to the MME 400. The bearer QoS may include QCI, ARP, APN-AMBR and the like, and upon receiving the update bearer request message, the SGW 600 and the MME 400 may update the bearer QoS.

In step 1013, if a UE-AMBR is changed due to the changed APN-AMBR, the MME 400 sends an S1-AP initial context setup request message including information about a new UE-AMBR, to the eNB 300 as a bearer modification request message, together with the updated bearer QoS information. In step 1015, the eNB 300 controls traffic based on the QCI, ARP and APN-AMBR included in the updated bearer QoS information, and the new UE-AMBR.

Figure 11:
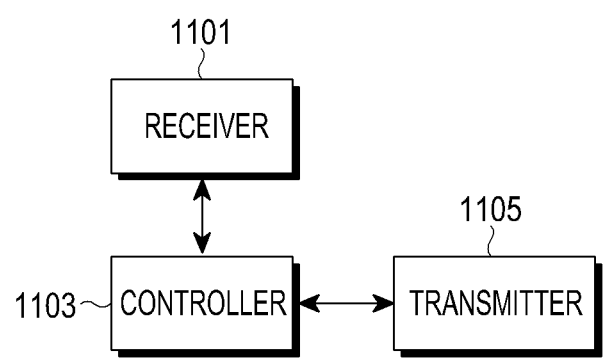
FIG. 11 illustrates a structure of each device included in a wireless communication system according to an embodiment of the present invention.

FIG. 11 illustrates a structure of each device included in a wireless communication system according to an embodiment of the present invention.

Referring to FIG. 11, each device shown in FIGS. 2 to 10 includes a receiver 1101, a controller 1103, and a transmitter 1105. Although the receiver 1101 and the transmitter 1105 are assumed to be separated from each other in FIG. 11, the receiver 1101 and the transmitter 1105 may be configured as a single physical component.

In accordance with the first to fourth embodiments of the present invention, the controller 1103 in each device may control traffic based on the UE's subscription information, the characteristics of a service/application, the traffic volume, and the updated bearer QoS, and may control the receiver 1101 and the transmitter 1105 to transmit and receive data. The traffic control operations according to the first to fourth embodiments of the present invention, which are performed in the controller 1103, have been described in detail with reference to FIGS. 2 to 10.

As is apparent from the foregoing description, if congestion has occurred in the UP where data for the UE is transmitted and received, the present invention may control traffic depending on the UE's subscription information, the characteristics of a service/application, the traffic volume, and the updated bearer QoS, thereby making it possible to improve the QoE in the congestion situations.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling traffic of a radio access network (RAN) by a base station in a wireless communication system, the method comprising:
   receiving, from a mobility management entity (MME), control information for controlling congestion in the RAN; and
   allocating resources in an uplink from the base station for a user equipment (UE), the resources being allocated based on the control information and a congestion condition in the RAN determined based at least in part on total traffic volume between the UE and the base station via two or more gateways,
   wherein the control information includes quality of service (QoS) information, the QoS information including a combination of priority information for a service and congestion information, and
   wherein the control information is updated by the MME based on information indicating that an amount of traffic used by the UE has reached a traffic volume limit value.

2. The method of claim 1, further comprising: acquiring subscription class information of the UE,
   wherein the subscription class information includes a service priority level of the UE according to a service subscription plan, is included in subscription information that is acquired in an initial context setup process of the UE, and the subscription information further includes subscription class information or relative priority information of the UE.

3. The method of claim 2, wherein the subscription class information of the UE includes flag information indicating whether the UE is in a top class among subscription classes which are distinguished depending on the service subscription plan.

4. The method of claim 1, further comprising: acquiring type information of the service based on a service descriptor, and
   wherein the service descriptor includes a identifier (ID) of the service, the QoS information, and a flow descriptor that includes a packet filter list, a bearer ID list, a combination list of a packet filter ID and a bearer ID, and flow direction information.

5. The method of claim 4, wherein the service descriptor is acquired by performing a bearer setup process and a policy and charging control (PCC) rule update process.

6. The method of claim 1, wherein the QoS information is acquired per a bearer.

7. The method of claim 1, wherein the QoS information further includes quality control information (QCI), an allocation and retention priority (ARP), an access point name (APN)-aggregated maximum bit rate (AMBR), and UE-AMBR information that is changed depending on the APN-AMBR.

8. A base station for controlling traffic of a radio access network (RAN) in a wireless communication system, the base station comprising:
    a transceiver configured to receive, from a mobility management entity (MME), control information for controlling congestion in the RAN; and
    a controller configured to allocate resources in an uplink from the base station for a user equipment (UE), the resources being allocated based on the control information and a congestion condition in the RAN determined based at least in part on total traffic volume between the UE and the base station via two or more gateways,
    wherein the control information includes quality of service (QoS) information, the QoS information including a combination of priority information for a service and congestion information,
    wherein the control information is updated by the MME based on information indicating that an amount of traffic used by the UE has reached a traffic volume limit value.

9. The base station of claim 8, wherein the transceiver acquires subscription class information of the UE, wherein the subscription class information includes a service priority level of the UE according to a service subscription plan, is included in subscription information that is acquired in an initial context setup process of the UE, and the subscription information further includes subscription class information or relative priority information of the UE.

10. The base station of claim 9, wherein the subscription class information of the UE user includes flag information indicating whether the UE is in a top class among subscription classes which are distinguished depending on the service subscription plan.

11. The base station of claim 8, wherein the transceiver acquires type information of the service based on a service descriptor, and the service descriptor includes a identifier (ID) of the service, the QoS information, and a flow descriptor that includes a packet filter list, a bearer ID list, a combination list of a packet filter ID and a bearer ID, and flow direction information.

12. The base station of claim 11, wherein the service descriptor is acquired by performing a bearer setup process and a policy and charging control (PCC) rule update process.

13. The base station of claim 8, wherein the QoS information is acquired per a bearer.

14. The base station of claim 8, wherein the QoS information further includes quality control information (QCI), an allocation and retention priority (ARP), an access point name (APN)-aggregated maximum bit rate (AMBR), and UE-AMBR information that is changed depending on the APN-AMBR.

* * * * *